Aug. 31, 1943.  W. A. LAWRENCE  2,328,082
TAILGATE MECHANISM
Filed Sept. 8, 1941   2 Sheets-Sheet 2

Inventor
Warren A. Lawrence
By Freast and Bishop
Attorneys

Patented Aug. 31, 1943

2,328,082

UNITED STATES PATENT OFFICE 2,328,082

TAILGATE MECHANISM

Warren A. Lawrence, Hayesville, Ohio

Application September 8, 1941, Serial No. 409,928

3 Claims. (Cl. 296—57)

The invention relates to tailgates or tailboards for trucks and similar vehicles, and more especially to mechanism for improving the operation of the tailgate.

Particularly in the larger, or heavier, types of motor trucks and trailers the tailgates are frequently of such large size and great weight as to require considerable effort on the part of the operator to open or close the same, making it not only extremely difficult but also dangerous to operate such tailgates, since the heavy tailgate may slip from the operator's grasp, falling upon him and causing bodily injury.

The present invention contemplates the provision of simple and efficient mechanism for substantially balancing the weight of the tailgate during the time the same is being raised or lowered, thus relieving the operator of the greater part of the burden of raising such heavy tailgates as well as protecting him from injury while so employed.

Another object of the invention is to provide such balancing mechanism for assisting in the operation of a tailgate, which is so constructed and located that it will not in any manner interfere with the normal use of the tailgate or the vehicle upon which it is mounted.

A further object of the invention is the provision of such mechanism which not only produces little if any projection beyond the edges of the vehicle, but which is protectively enclosed so as to prevent injury to the operator or others near to the vehicle when the tailgate is operated.

A still further object is the provision of tailgate mechanism of the general character referred to which permits the use of more or less standard locking or latching means for normally holding the tailgate in closed position.

Still another object is the provision of a cam lock for normally locking the mechanism to hold the tailgate in closed position, means being provided for releasing said cam lock when the usual locking or latching bars are released to permit opening or lowering of the tailgate.

Another object is the provision of means for operating the cam lock to hold the tailgate in any desired position between the fully closed and fully opened positions.

A further object of the invention is the provision of a novel hinge for the tailgate designed to close the hinge joint between the tailgate and the vehicle when the tailgate is opened to horizontal position.

Figure 1:
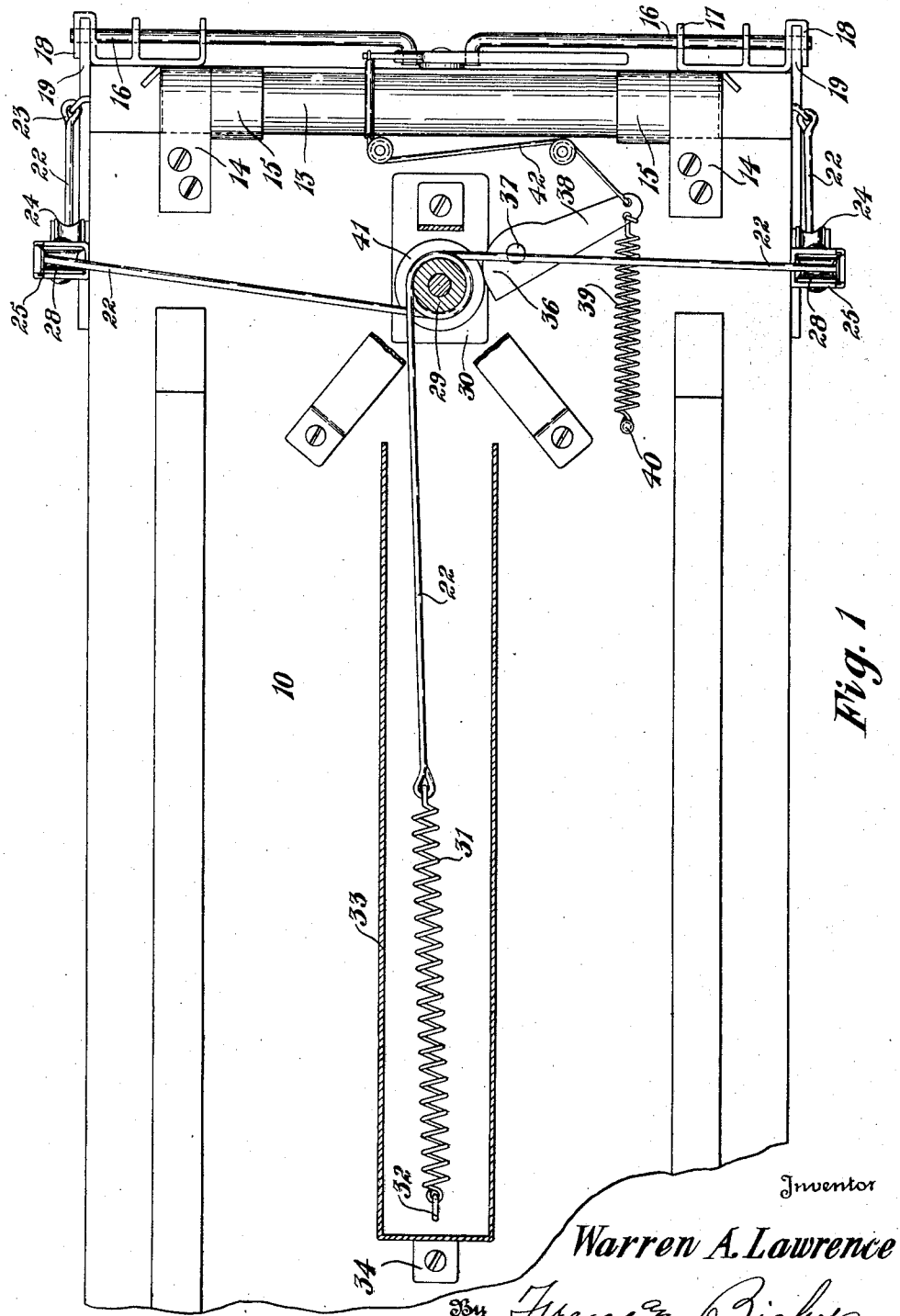
Figure 2:
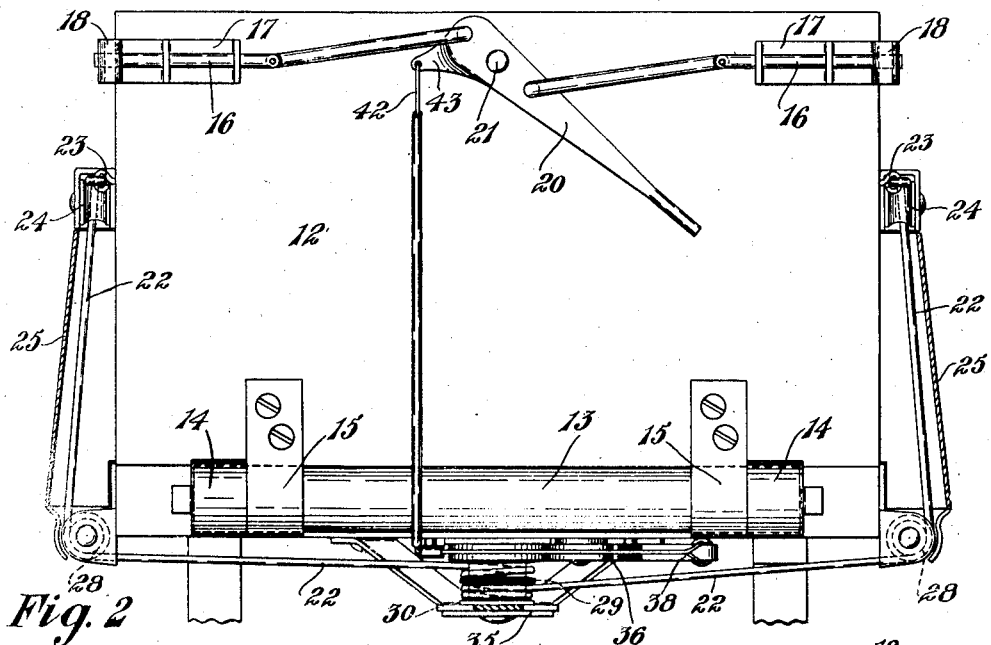
Figure 3:
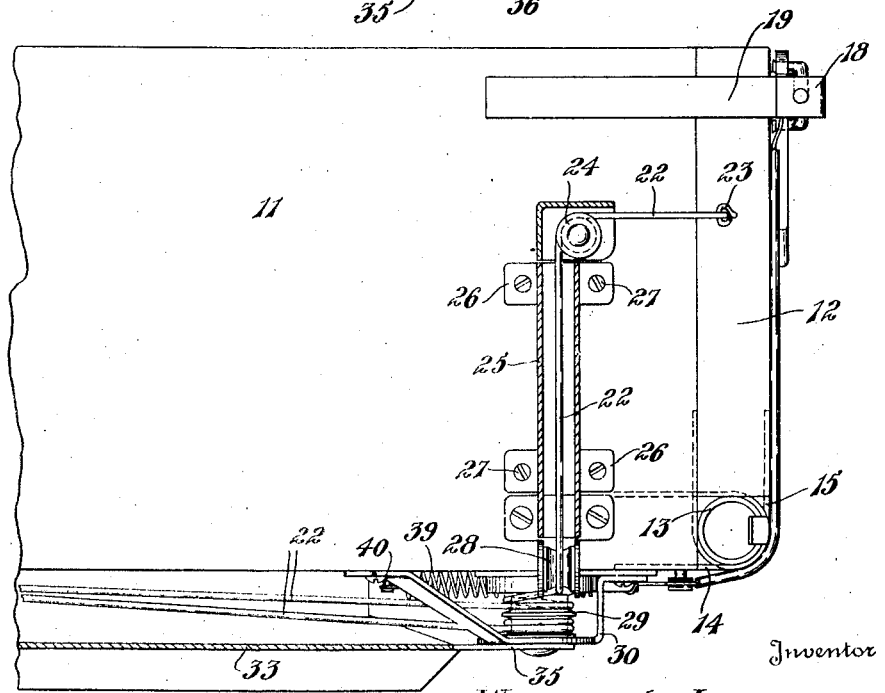

The above objects together with others which will be apparent from the drawings and following description or which may be later referred to may be attained by constructing the improved tailgate mechanism in the manner illustrated in the accompanying drawings in which Figure 1 is a bottom plan view of the rear portion of a vehicle provided with the improved tailgate mechanism, parts being broken away for the purpose of illustration;

Fig. 2, a rear elevation of the vehicle body showing the tailgate in the raised or closed and locked position; and Fig. 3, a side elevation of the rear portion of the vehicle showing the tailgate in the closed position with parts broken in section.

Similar numerals refer to similar parts throughout the several views.

The vehicle body may include the bottom wall 10 and side walls 11 constructed in any usual and well-known manner, the rear end of the vehicle being arranged to be closed by the tailgate 12.

This tailgate is hingedly connected at its lower end to the rear end of the bottom wall 10 of the vehicle by means of a novel hinge construction which completely closes the hinge joint between the vehicle bottom and tailgate when the tailgate is in open position, this prevents material being loaded or unloaded becoming accidentally caught in the hinge joint and is especially desirable upon trucks or trailers used for transporting livestock of any kind as with the tailgate in substantially horizontal position the animals may be driven across the tailgate into or out of the vehicle without danger of catching their hooves in the hinge joint.

This hinge joint comprises a hinge pin 13, which may be in the form of a tube to reduce the weight of the same, and of a diameter almost the thickness of the tailgate and bottom wall 10 of the vehicle. This hinge pin is connected to the bottom wall 10, at each end, by the U-shaped straps 14, within which the hinge pin may be journaled, and is connected to the lower end of the tailgate by similar U-shaped straps 15.

With this construction it will be seen that when the tailgate is opened the large hinge pin 13 will substantially fill the joint between the tailgate and the bottom wall of the vehicle.

For the purpose of locking the tailgate in the closed or raised position shown in the drawings a lock or latch bar mechanism of more or less usual design may be provided comprising a pair of latch bolts 16 slidably located through brackets 17 mounted upon the tailgate near the upper corners thereof and adapted to be projected through the U-shaped terminals 18 of said brackets and through the apertured plates 19 fixed to the side walls 11 of the vehicle.

The inner ends of the lock bolts 16 are operatively connected to an operating lever 20 on opposite sides of the fulcrum 21 thereof by means of which the lever is pivotally connected to the tail gate.

With the lever 20 in the position best shown in Fig. 2 the locking bolts 16 are projected through the U-shaped end portions 18 of the brackets 17 and through the apertured plates 19 upon the sides of the vehicle holding the tailgate locked in the raised or closed position.

It will be seen that when the lever 20 is rotated in a clockwise direction, the bolts 16 will be withdrawn from the plates 19 and U-shape portions 18 of the brackets permitting the tailgate to be swung downward upon its hinge.

The balancing mechanism for the tailgate includes a pair of cables or other flexible members 22 connected at their ends to the side edges of the tailgate near the upper end thereof as at 23.

These cables extend forwardly along the side-walls 11 of the vehicle and pass over pulleys 24 located within the upper ends of the housing 25 attached to the side walls of the vehicle as by the ears 26 through which screws or the like as indicated at 27 may be located.

Each cable 22 after passing over the pulley 24 extends downward through the housing 25 and then around a pulley 28 located in the lower end of the housing, the cables 22 then extending horizontally below the bottom wall 10 of the vehicle toward the longitudinal center thereof where they are snubbed around a pulley 29 journaled in a bracket 30 attached to the under side of the bottom wall 10.

Both cables 22 then extend forwardly beneath the bottom of the vehicle and are connected to one end of a coil spring 31, the other end of which is connected to the bottom wall 10 of the vehicle as at 32.

A housing 33 may be provided for enclosing the spring 32 and the adjacent end portions of the cables 22, the housing being connected at its forward end to bottom wall 10 as by the lug 34 and the rear end of the housing being attached to the bracket 30 as indicated at 35.

It will be seen that as the tailgate is swung downward or upward upon its hinge the spring 31 through the cables 22 will balance the weight of the tailgate relieving the operator of a considerable part of the weight and making it impossible for the tail gate to accidentally fall and injure the operator while he is raising or lowering the same.

A friction brake may be provided for locking the tailgate in any desired position.

This brake may be in the form of an eccentric 36 pivoted as at 37 upon the bottom wall 10 and provided with a lever arm 38 connected at its outer end to one end of a coil spring 39, the other end of which is connected to the bottom wall as at 40 thus normally urging the eccentric 36 into frictional contact with the peripheral flange 41 upon the pulley 29 so as to hold the pulley 29 and through it the cables 22 and tail gate 12 against movement.

For the purpose of releasing this eccentric brake to permit movement of the tailgate a choke wire or the like as indicated at 42 may be connected to the lever arm 38 of the eccentric brake and to the angular arm 43 upon the operating lever 20.

It will be seen that if the lever 20 is moved in clockwise direction to release the locking bolts 16 the choke wire 42 will be pulled upward swinging the eccentric 36 upon its pivot, against the pull of the spring 39 and releasing the frictional contact upon the flange 41 of the pulley 29.

When the tailgate has been lowered to the desired position the lever 20 may be moved in counter-clockwise direction back to the position shown in Fig. 2 releasing the choke wire 42 and permitting the spring 39 to pull the eccentric 36 back into frictional contact with the flange 41 holding the pulley 29 against movement thus locking the tailgate in horizontal or other open or partly opened position.

I claim:

1. In combination with a vehicle body, a tailgate horizontally hinged at its lower end to the vehicle body and being substantially vertical in closed position, a pair of flexible members each connected at one end to the tailgate near the top thereof, pulleys on the sides of the vehicle body over which the flexible members are located, a pulley on the bottom of the vehicle body around which the flexible members are snubbed, a spring connected at one end to the other ends of the flexible members, the other end of the spring being connected to the bottom of the vehicle body, a friction brake associated with the bottom pulley for normally preventing movement of the tailgate, locking bars for locking the tailgate in closed position, and means associated with the locking bars for simultaneously releasing the locking bars and the friction brake.

2. In combination with a vehicle body, a tailgate horizontally hinged at its lower end to the vehicle body and being substantially vertical in closed position, a pair of flexible members each connected at one end to the tailgate near the top thereof, pulleys on the sides of the vehicle body over which the flexible members are located, a pulley on the bottom of the vehicle body around which the flexible members are snubbed, a spring connected at one end to the other ends of the flexible members, the other end of the spring being connected to the bottom of the vehicle body, a friction brake associated with the bottom pulley for normally preventing movement of the tailgate, locking bars for locking the tailgate in closed position, means associated with the locking bars for simultaneously releasing the locking bars and the friction brake, and means for applying the friction brake in any position of the tailgate.

3. In combination with a vehicle body, a tailgate horizontally hinged at its lower end to the vehicle body and being substantially vertical in closed position, a pair of flexible members each connected at one end to the tailgate near the top thereof, pulleys on the sides of the vehicle body over which the flexible members are located, a pulley on the bottom of the vehicle body around which the flexible members are snubbed, a spring connected at one end to the other ends of the flexible members, the other end of the spring being connected to the bottom of the vehicle body, a friction brake associated with the bottom pulley for normally preventing movement of the tailgate, locking bars for locking the tailgate in closed position, an operating lever for operating the locking bars, a flexible member connecting the friction brake with said operating lever, and spring means normally urging the friction brake into contact with the bottom pulley.

WARREN A. LAWRENCE.